United States Patent
Kogo

(10) Patent No.: US 10,366,806 B2
(45) Date of Patent: Jul. 30, 2019

(54) VEHICLE ELECTRIC WIRE AND WIRE HARNESS USING THE SAME

(71) Applicant: Yazaki Corporation, Tokyo (JP)

(72) Inventor: Kosuke Kogo, Shizuoka (JP)

(73) Assignee: YAZAKI CORPORATION, Minato-ku, Tokyo (JP)

(*) Notice: Subject to any disclaimer, the term of this patent is extended or adjusted under 35 U.S.C. 154(b) by 0 days.

(21) Appl. No.: 16/166,375

(22) Filed: Oct. 22, 2018

(65) Prior Publication Data

US 2019/0057793 A1    Feb. 21, 2019

Related U.S. Application Data

(63) Continuation of application No. PCT/JP2017/013740, filed on Mar. 31, 2017.

(30) Foreign Application Priority Data

May 17, 2016   (JP) .................................. 2016-098517
Oct. 21, 2016   (JP) .................................. 2016-206570

(51) Int. Cl.
*H01B 7/00*   (2006.01)
*H01B 3/44*   (2006.01)
(Continued)

(52) U.S. Cl.
CPC ........... *H01B 3/44* (2013.01); *B60R 16/0207* (2013.01); *C08L 27/06* (2013.01); *H01B 7/02* (2013.01);
(Continued)

(58) Field of Classification Search
CPC ... H01B 7/02; H01B 7/04; H01B 7/06; H01B 9/02; H01B 9/04; H01B 9/06; H01B 11/02; H01B 11/04; H01B 11/06
(Continued)

(56) References Cited

U.S. PATENT DOCUMENTS 5,543,449 A * 8/1996 Drewes ..................... C08K 3/16
                                                    264/331.15
5,936,037 A * 8/1999 Tasaka ...................... C08K 5/01
                                                    524/504
(Continued)

FOREIGN PATENT DOCUMENTS

JP    04-359814 A    12/1992
JP    05-339452 A    12/1993
(Continued)

OTHER PUBLICATIONS

Communication dated Jan. 8, 2019, from the Japanese Patent Office in counterpart application No. 2016-206570.
(Continued)

*Primary Examiner* — William H. Mayo, III
(74) *Attorney, Agent, or Firm* — Sughrue Mion, PLLC

(57) ABSTRACT

A vehicle electric wire includes an electrical insulation coating layer which contains a vinyl chloride resin, a plasticizer and a compound containing a lanthanoid, wherein an electrical conductor is coated with the electrical insulation coating layer. In the electrical insulation coating layer, a content of the plasticizer with respect to 100 parts by mass of the vinyl chloride resin is 25 parts by mass or more and less than 50 parts by mass.

5 Claims, 2 Drawing Sheets

(51) Int. Cl.
*H01B 7/02* (2006.01)
*B60R 16/02* (2006.01)
*H01R 4/64* (2006.01)
*C08L 27/06* (2006.01)

(52) U.S. Cl.
CPC ......... *H01R 4/646* (2013.01); *H01R 2201/26* (2013.01)

(58) Field of Classification Search
USPC .............. 174/110 R, 110 SR, 120 R, 120 SR
See application file for complete search history.

(56) References Cited

U.S. PATENT DOCUMENTS

| | | | | |
|---|---|---|---|---|
| 6,531,533 | B1* | 3/2003 | Kuhn | .................. C08K 3/34 524/178 |
| 6,897,275 | B2* | 5/2005 | Wang | .................. B01J 31/1805 502/155 |
| 2006/0183835 | A1* | 8/2006 | Hoerold | .................. B82Y 30/00 524/414 |
| 2006/0189731 | A1* | 8/2006 | Girois | .................... C08K 5/005 524/191 |
| 2007/0093584 | A1* | 4/2007 | Hoerold | .................. C08K 3/02 524/414 |

FOREIGN PATENT DOCUMENTS

| | | |
|---|---|---|
| JP | 07-173355 A | 7/1995 |
| JP | 07-216168 A | 8/1995 |
| JP | 09-147632 A | 6/1997 |
| JP | 11-176240 A | 7/1999 |
| JP | 2010-055925 A | 3/2010 |
| JP | 2011-096505 A | 5/2011 |

OTHER PUBLICATIONS

Notifications of Reasons for Refusal for 2016-206570 dated Sep. 25, 2018.
International Search Report for PCT/JP2017/013740 dated Apr. 25, 2017 [PCT/ISA/210].

* cited by examiner

VEHICLE ELECTRIC WIRE AND WIRE HARNESS USING THE SAME

CROSS REFERENCE TO RELATED APPLICATION

This application is a Continuation of PCT Application No. PCT/JP2017/013740, filed on Mar. 31, 2017, and claims the priorities of Japanese Patent Application No. 2016-098517 filed on May 17, 2016 and Japanese Patent Application No. 2016-206570 filed on Oct. 21, 2016, the contents of all of which are incorporated herein by reference.

BACKGROUND

1. Technical Field

The present invention relates to a vehicle electric wire and a wire harness using the vehicle electric wire. More specifically, the present invention relates to a vehicle electric wire which has an improved heat resistance, and a wire harness using the vehicle electric wire.

2. Related Art

Conventionally, to route a vehicle electric wire at a portion such as an engine room for which a high heat resistance is demanded, a crosslinked polyethylene electric wire is mainly used. The main reason that the crosslinked polyethylene is used as a coating member is that heat aging resistance characteristics are excellent and crosslinking processing can enhance a heat resistance.

However, unless the crosslinking processing is performed on the polyethylene, the heat resistance cannot be enhanced. A contrivance needs to be made for a material composition of the coating member to further secure the heat resistance more. Therefore, cost tends to become high. Furthermore, a polyethylene resin does not have incombustibility. Therefore, the polyethylene resin needs to be mixed a great amount of flame retardant, and tends to be a relatively expensive material. Furthermore, the polyethylene resin has a relatively high material stretchability. Hence, when an end of the electric wire is peeled, an end surface of the electric wire is torn, and the coating member having entered a gap of an electrical conductor remains. Therefore, there is a problem in keeping quality. Consequently, it is considered to use as the coating member a vinyl chloride resin which does not need to be subjected to the crosslinking processing, is low-cost and is easy to process.

For example, Patent Literature 1 discloses a vinyl chloride resin composition for coating a heat resistant electric wire obtained by mixing the vinyl chloride resin with predetermined amounts of a hydrotalcite compound and a trimellitate plasticizer. Further, Patent Literature 1 discloses that this composition improves a heat resistance without using a hazardous heavy metal such as lead and barium.

Patent Literature 1: Japanese Patent Unexamined Publication No. H11-176240

SUMMARY

However, the electric wire according to Patent Literature 1 has an insufficient heat resistance for use as a vehicle electric wire. Therefore, it is concerned that, when this electric wire is used in high temperature environment of a vehicle, an electrical insulation property cannot be sufficiently secured.

Furthermore, when the heat resistance of the vinyl chloride resin composition is further enhanced, it is necessary to increase a mixing amount of the stabilizer compared to the conventional technique to suppress a dehydrochlorination reaction of the vinyl chloride resin which is a base material. However, there is concern that simply increasing the stabilizer, which is conventionally used and is mainly composed of hydrotalcite, lowers an abrasion resistance of the resin composition to be obtained, and deteriorates material processability for obtaining the resin composition.

The present invention has been made in light of this problem of the conventional technique. An object of the present invention is to provide a vehicle electric wire which has an improved heat resistance, and a wire harness using the vehicle electric wire.

A vehicle electric wire according to a first aspect of the present invention includes: an electrical insulation coating layer which contains a vinyl chloride resin, a plasticizer and a compound containing a lanthanoid; and an electrical conductor which is coated with the electrical insulation coating layer. In the electrical insulation coating layer, a content of the plasticizer with respect to 100 parts by mass of the vinyl chloride resin is 25 parts by mass or more and less than 50 parts by mass. Furthermore, when dynamic viscoelasticity measurement using a dynamic viscoelasticity measurement device is performed on the electrical insulation coating layer at 0.5 Hz in frequency and under a temperature rise condition of 2° C./minute in temperature rise speed in a single cantilever measurement mode, a storage modulus at 140° C. is 0.1 MPa or more.

Relative to the vehicle electric wire according to the first aspect, in the vehicle electric wire according to a second aspect of the present invention, when a scrape abrasion test defined by ISO 6722:2006 is conducted on the electric wire in which a thickness of the electrical insulation coating layer is 0.25 to 0.40±0.05 mm, the number of cycles of reciprocating movement is five or more. A condition of the scrape abrasion test is that a needle whose diameter is 0.45±0.01 mm is used, and a vertical force of 2±0.05 N is applied under an atmosphere at 120±1° C.

Relative to the vehicle electric wire according to the first or second aspect, in the vehicle electric wire according to a third aspect of the present invention, the compound containing the lanthanoid is at least one of lanthanum oxide and lanthanum hydroxide.

Relative to the vehicle electric wire according to one of the first to third aspects, in the vehicle electric wire according to a fourth aspect of the present invention, the plasticizer is a trimellitic acid alkyl ester, and the electrical insulation coating layer further contains a stabilizer containing a hydrotalcite. Furthermore, in the electrical insulation coating layer, with respect to 100 parts by mass of the vinyl chloride resin, the content of the plasticizer is 25 parts by mass or more and less than 50 parts by mass, a content of the stabilizer is 1 to 15 parts by mass, and a content of the compound containing the lanthanoid is 1 to 15 parts by mass.

Relative to the vehicle electric wire according to the fourth aspect, in the vehicle electric wire according to a fifth aspect of the present invention, the trimellitic acid alkyl ester includes a linear alkyl group containing nine carbon atoms.

A wire harness according to a sixth aspect of the present invention includes the vehicle electric wire according to any one of the first to fifth aspects.

BRIEF DESCRIPTION OF DRAWINGS

FIG. 3A is a perspective view of the wire harness. FIG. 3B is a cross-sectional view taken along a line A-A in FIG. 3A.

DETAILED DESCRIPTION

A vehicle electric wire and a wire harness according to an embodiment of the present invention will be described in detail below with reference to the drawings. In addition, dimension ratios of the drawings are exaggerated for ease of description, and differ from actual ratios in some cases.

A conventional vehicle crosslinked polyethylene electric wire has high heat resistance characteristics, and therefore is used as a wire harness electric wire applied to a high temperature portion of the vehicle. The crosslinked polyethylene is a material which conforms to a heat resistance test according to vehicle electric wire standards, and can maintain a high storage modulus even in high temperature environment. Hence, the crosslinked polyethylene can secure high reliability which takes into account abrasion caused by contact with other members in temperature and vibration environment which needs to be taken into account when the vehicle crosslinked polyethylene electric wire is mounted on a vehicle.

The inventors of the invention have studied this crosslinked polyethylene and found as a result that it is important for a coating member of a wire harness electric wire under high temperature environment to have 0.1 MPa or more in storage modulus at 140° C. Furthermore, a resin composition which is low-cost and has an elastic modulus exceeding a certain level under high temperature environment is necessary as a material of the coating member. The present invention can solve these problems by using a polyvinyl chloride resin having an appropriate mixture.

Figure 1:
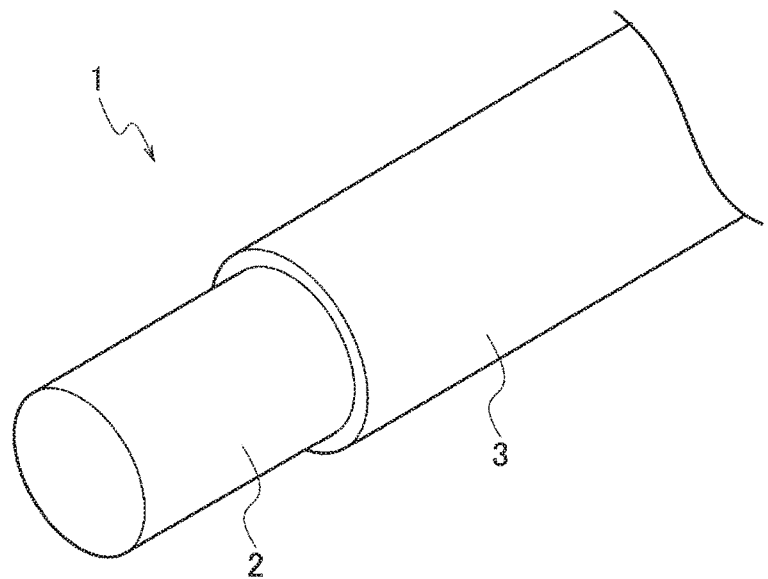
FIG. 1 is a schematic perspective view illustrating a vehicle electric wire according to an embodiment of the present invention.

As illustrated in FIG. 1, a vehicle electric wire 1 according to the present embodiment includes an electrical conductor 2 and an electrical insulation coating layer 3 which coats around the electrical conductor 2.

The electrical conductor 2 to be used may be a single wire consisted by one strand or may be a stranded wire obtained by stranding a plurality of strands. The stranded wire to be used may be also any of a concentric stranded wire obtained by concentrically stranding strands around one or a plurality of strands; a collective stranded wire obtained by collectively stranding a plurality of strands in the same direction; and a complex stranded wire obtained by concentrically stranding a plurality of collective stranded wires.

The diameter of the electrical conductor 2 and the diameter of each strand constituting the electrical conductor are not limited in particular, either. Furthermore, a material of the electrical conductor 2 is not limited in particular, either, a known electroconductive metal material such as copper, copper alloy, aluminum and aluminum alloy can be used. Furthermore, a surface of the electrical conductor may be plated or may be tin-plated, silver-plated or nickel-plated.

The electrical insulation coating layer 3 which coats an outer circumference of the electrical conductor 2 is formed by a resin composition which can secure an electrical insulation property with respect to the electrical conductor 2. More specifically, the electrical insulation coating layer 3 contains a vinyl chloride resin and a plasticizer. Furthermore, in the present embodiment, the electrical insulation coating layer 3 contains a compound containing a lanthanoid (lanthanoid containing compound) to improve a heat resistance thereof. By mixing the vinyl chloride resin and the plasticizer together with the lanthanoid containing compound, it is possible to improve the heat resistance of the electrical insulation coating layer for a long period of time, and secure the high electrical insulation property even in high temperature environment such as an engine room of a vehicle.

The vinyl chloride resin used for the electrical insulation coating layer 3 can include, for example, a polyvinyl chloride, a chlorinated polyvinyl chloride, a polyvinylidene chloride, a chlorinated polyethylene, a vinyl chloride-vinyl acetate copolymer, a vinyl chloride-ethylene copolymer, a vinyl chloride-propylene copolymer, a vinyl chloride-styrene copolymer, a vinyl chloride-isobutylene copolymer, a vinyl chloride-vinylidene chloride copolymer, a vinyl chloride-styrene-maleic anhydride copolymer, a vinyl chloride-styrene-acrylonitrile copolymer, a vinyl chloride-butadiene copolymer, a vinyl chloride-isoprene copolymer, a vinyl chloride-chlorinated propylene copolymer, a vinyl chloride-vinylidene chloride-vinyl acetate copolymer, a vinyl chloride-maleic ester copolymer, a vinyl chloride-methacrylic ester copolymer, a vinyl chloride-acrylonitrile copolymer, and vinyl chloride-various vinyl ether copolymers. For these vinyl chloride resins, one type may be used alone or two or more types may be combined and used. In addition, a method for polymerizing the vinyl chloride resin is bulk polymerization, solution polymerization, suspension polymerization and emulsion polymerization, and is not limited in particular.

An average degree of polymerization (weight average degree of polymerization) of the vinyl chloride resin is not limited in particular, is preferably 500 to 5000 and is more preferably 2000 to 4000. When average degree of polymerization is 500 or more, it is possible to suppress a decrease in the heat resistance of the electrical insulation coating layer 3 to be obtained. Furthermore, when the average degree of polymerization is 5000 or less, it is possible to suppress a rise in melt viscosity during extrusion molding, and moreover, prevent deterioration of kneading and molding processability. In addition, for the electrical insulation coating layer 3 according to the present embodiment, one type or two or more types of the vinyl chloride resins within a range of the above degree of polymerization may be combined and used.

As long as the plasticizer used for the electrical insulation coating layer 3 permeates between molecules of the vinyl chloride resin, weakens an intermolecular force of the resin, and provides flexibility to the vinyl chloride resin, the plasticizer is not limited in particular. However, in the present embodiment, the plasticizer preferably includes one type or two or more types selected from a trimellitic acid plasticizer and a pyromellitic acid plasticizer. The trimellitic acid plasticizer and the pyromellitic acid plasticizer have an excellent heat resistance and weather resistance, and low volatility, and therefore are suitable for the electrical insulation coating layer 3 for which a long-term heat resistance is demanded.

The trimellitic acid plasticizer can include a trimellitic acid ester. Furthermore, the pyromellitic acid plasticizer can include a pyromellitic acid ester. In addition, alcohols composing an ester by dehydration condensation in the trimellitic acid ester and the pyromellitic acid ester can include saturated aliphatic alcohols containing carbon atoms of 8-13. These alcohols can be used singly or two or more types in combination.

The plasticizer used for the electrical insulation coating layer 3 is preferably the trimellitic acid plasticizer, and is particularly preferably the trimellitic acid alkyl ester. An alkyl group of the plasticizer influences various electric wire characteristics such as heat resistant lifetime characteristics depending on a type of the alkyl group. Furthermore, from a viewpoint of material processability, the alkyl group influences gelation characteristics depending on a type of the alkyl group. Hence, comprehensively taking these influences into account, the alkyl group of the trimellitic acid plasticizer is preferably a linear alkyl group containing carbon atoms of 8-10, and is more preferably the linear alkyl group containing nine carbon atoms. Furthermore, when the trimellitic acid alkyl ester is used as the plasticizer, the trimellitic acid alkyl ester preferably includes a linear alkyl group containing carbon atoms of 8-10, and more preferably includes the linear alkyl group containing nine carbon atoms (n-nonyl group). In addition, the lengths of the alkyl groups of trimellitic acid plasticizer molecules may be a mixture of lengths of the 8 C or more and 10 C or less alkyl groups.

The plasticizer used for the electrical insulation coating layer 3 may include plasticizers other than the trimellitic acid plasticizer and the pyromellitic acid plasticizer. Other plasticizers can include a phthalate plasticizer and an aliphatic plasticizer. When a content of the entire plasticizer is within the specific range described below, and contents of the trimellitic acid plasticizer and the pyromellitic acid plasticizer are within specific ranges, it is possible to improve the heat resistance while providing flexibility to the electrical insulation coating layer 3. In addition, a main component of the plasticizer used for the electrical insulation coating layer 3 is preferably at least one of the trimellitic acid plasticizer and the pyromellitic acid plasticizer. That is, in the plasticizer used for the electrical insulation coating layer 3, the total content of the trimellitic acid plasticizer and the pyromellitic acid plasticizer is preferably 50% by mass or more, is more preferably 70% by mass or more and is particularly preferably 95% by mass or more.

The phthalate plasticizer can include a phthalate ester. Alcohols composing an ester by dehydration condensation in the phthalate ester can include saturated aliphatic alcohols containing carbon atoms of 8-13. Furthermore, these alcohols can be used singly or two or more types in combination. More specifically, the phthalate plasticizer can be, for example, at least one type selected from the group consisting of a Di-2-ethylhexyl phthalate, a Di-n-octyl phthalate, a diisononyl phthalate, a diisononyl phthalate, a diisodecyl phthalate, and a ditridecyl phthalate.

The aliphatic plasticizer can be at least one type selected from the group consisting of an adipic ester, a sebacic ester, and an azelaic ester. In addition, alcohols composing an ester by dehydration condensation in these esters can include saturated aliphatic alcohols containing carbon atoms of 3-13. Furthermore, these alcohols can be used singly or two or more types in combination. More specifically, the aliphatic plasticizer can be, for example, at least one type selected from the group consisting of a dioctyl adipate, an isononyl adipate, a dibutyl sebacate, a dioctyl sebacate, and a dioctyl azelate.

In the electrical insulation coating layer 3, the content of the plasticizer with respect to 100 parts by mass of the vinyl chloride resin is preferably 25 parts by mass or more and less than 50 parts by mass. When the content of the plasticizer is less than 25 parts by mass, the heat resistance of the electrical insulation coating layer 3 deteriorates, and it is difficult to keep the high heat resistance under high temperature environment. Furthermore, there is also an influence such as deterioration of low temperature performance of the electrical insulation coating layer 3. Therefore, the electrical insulation coating layer 3 is not suitable for use in the vehicle wire harness. In addition, when the content of the plasticizer is 50 parts by mass or more, plasticization of the electrical insulation coating layer 3 advances and elasticity during a high temperature lowers. Therefore, there is concern that a high temperature physical property necessary for a wire harness cannot be secured. In addition, the content of the plasticizer with respect to 100 parts by mass of the vinyl chloride resin is more preferably 25 to 49 parts by mass, is still more preferably 25 to 40 parts by mass and is particularly preferably 25 to 35 parts by mass.

To secure a long-term heat resistance and an electrical insulation property under a high temperature condition, the electrical insulation coating layer 3 contains a compound containing a lanthanoid. By using the compound containing the lanthanoid, it is possible to enhance the heat resistance of the electrical insulation coating layer 3 whose main component is the vinyl chloride resin.

For the compound containing the lanthanoid, a lanthanoid oxide is preferably used. Furthermore, for the compound containing the lanthanoid, lanthanum oxide ($La_2O_3$) is preferably used. This lanthanoid oxide can further enhance the heat resistance of the vinyl chloride resin. In addition, lanthanum oxide reacts with moisture in air, and becomes lanthanum hydroxide ($La(OH)_3$) in some cases. In this regard, even when part of lanthanum oxide contained in the electrical insulation coating layer 3 becomes lanthanum hydroxide, it is possible to suppress deterioration of the vinyl chloride resin, and enhance the heat resistance of the electrical insulation coating layer 3. Therefore, the compound containing the lanthanoid may be at least one of lanthanum oxide and lanthanum hydroxide.

In the electrical insulation coating layer 3, a content of a lanthanoid containing compound with respect to 100 parts by mass of the vinyl chloride resin is preferably 3 to 15 parts by mass. When the content of the lanthanoid containing compound is within this range, it is possible to enhance dispersiveness inside the vinyl chloride resin, and improve the heat resistance of the electrical insulation coating layer 3.

A mean particle diameter (D50) of the compound containing the lanthanoid is not limited in particular, and is preferably 20 μm or less, for example. When the mean particle diameter of the compound containing the lanthanoid is 20 μm or less, it is possible to enhance dispersiveness in the electrical insulation coating layer 3 and improve the heat resistance. In addition, the mean particle diameter of the compound containing the lanthanoid in the electrical insulation coating layer 3 can be calculated by observing a cross section of the electrical insulation coating layer 3 by a scanning electron microscope.

The electrical insulation coating layer 3 according to the present embodiment can be mixed with various additives in addition to the above materials. The additives include a stabilizer, a filler, a pigment, an antioxidant, an extender, a metal deactivator, an age register, a lubricant, a reinforcing agent, an ultraviolet absorber, a dye, a coloring agent, an antistatic agent a foaming agent and the like.

The electrical insulation coating layer 3 preferably further includes a stabilizer as an additive. The stabilizer can suppress deterioration and decomposition of a vinyl chloride caused by heat during processing, and keep the heat resistance of the electrical insulation coating layer 3 after molding for a long period of time.

For the stabilizer, at least one type selected from the group consisting of a Sn-based stabilizer, a Ba-based stabilizer, a Zn-based stabilizer, a Ca-based stabilizer, a Pb-based stabilizer, a Zn—Ca-based stabilizer and a Zn—Mg-based stabilizer can be used. In addition, the Zn—Ca-based stabilizer is preferably used for the stabilizer. This composite metal soap-based stabilizer has an excellent heat resistance and, consequently, can secure the heat resistance of the electrical insulation coating layer 3 which is necessary for a high temperature portion of a vehicle for a long period of time.

Furthermore, for the stabilizer contained in the electrical insulation coating layer 3, it is also preferable to use a stabilizer containing hydrotalcite. Furthermore, the stabilizer containing hydrotalcite contains hydrotalcite as a main component, and is more preferably mixed with various materials for suppressing heat deterioration of the vinyl chloride.

The content of the stabilizer with respect to 100 parts by mass of the vinyl chloride resin in the electrical insulation coating layer 3 is preferably 1 to 20 parts by mass, is more preferably 2 to 20 parts by mass, is still more preferably 5 to 20 parts by mass and is particularly preferably 5 to 15 parts by mass. Even when the content of the stabilizer is outside this range, it is possible to secure a high heat resistance for a long period of time. In this regard, when the content of the stabilizer increases, lubricity of a resin composition increases, and therefore is likely to cause undergelation. The undergelation is likely to have a negative influence such as roughening of an appearance during extruding of electric wires, and a rise in a resin pressure on electric wire manufacturability. Hence, taking into account kneading processability of a material of the electrical insulation coating layer 3, the content of the stabilizer with respect to 100 parts by mass of the vinyl chloride resin is particularly preferably 5 to 10 parts by mass.

As described above, the lanthanoid containing compound has an effect of enhancing the heat resistance of the polyvinyl chloride similar to the stabilizer. In this regard, the lanthanoid containing compound differs from the stabilizer in having no negative effect on gelation of the material of the electrical insulation coating layer 3. Hence, the content of the lanthanoid containing compound is preferably 50% by mass or more with respect to the content of the stabilizer. In addition, the lanthanoid containing compound has concealment, and therefore when the content increases, a color of the electrical insulation coating layer 3 to be obtained becomes white in some cases.

Preferably, in the electrical insulation coating layer 3, the plasticizer is the trimellitic acid alkyl ester, and the stabilizer is the stabilizer containing hydrotalcite. Further, preferably, in the electrical insulation coating layer, with respect to 100 parts by mass of the vinyl chloride resin, the content of the plasticizer is 25 parts by mass or more and less than 50 parts by mass, the content of the stabilizer is 1 to 15 parts by mass, and the content of the compound containing the lanthanoid is 1 to 15 parts by mass. Furthermore, the content of the compound containing the lanthanoid is preferably 1 to 10 parts by mass. The electrical insulation coating layer 3 having such a composition has not only an excellent heat resistance but also a good abrasion resistance, and can provide a good electrical insulation property even when used in high temperature environment.

The thickness of the electrical insulation coating layer 3 is not limited in particular as long as the electrical insulation coating layer 3 can secure the electrical insulation property for the vehicle electric wire 1, and can be 0.25 mm to 2 mm, for example.

Figure 2:
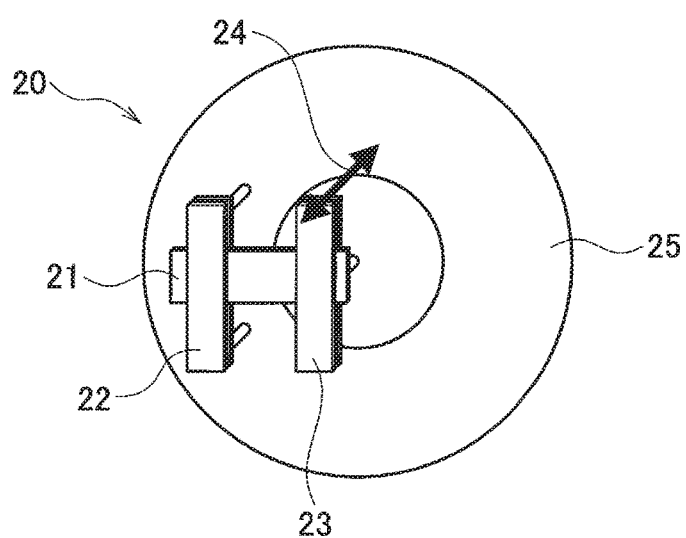
FIG. 2 is a schematic view illustrating a method for measuring dynamic viscoelasticity by using a dynamic viscoelasticity measurement device.

As described above, to secure high reliability which takes into account abrasion caused by contact with other members in temperature and vibration environment which needs to be taken into account when a vehicle electric wire is mounted on a vehicle, a coating member of the vehicle electric wire preferably has a predetermined storage modulus. Hence, according to the vehicle electric wire 1, when dynamic viscoelasticity measurement using a dynamic viscoelasticity measurement device (Tritec2000 manufactured by Shimadzu Corporation) is performed on the electrical insulation coating layer 3 at 0.5 Hz in frequency and 2° C./minute in temperature rise speed while setting a single cantilever measurement mode as a modified mode, the storage modulus at 140° C. is preferably 0.1 MPa or more. In addition, FIG. 2 illustrates a method for measuring the dynamic viscoelasticity by using a dynamic viscoelasticity measurement device 20, and illustrates a state where an interior of a thermostatic chamber is seen from a side. Reference numeral 21 in FIG. 2 denotes a test piece made from a material which makes the electrical insulation coating layer 3. Reference numeral 22 denotes a fixing clamp for fixing one end of the test piece 21. Reference numeral 23 denotes a vibration contact for vibrating the other end of the test piece 21. Reference numeral 24 denotes a motion of the vibration contact 23. Furthermore, reference numeral 25 denotes a geometry disk.

Furthermore, according to the vehicle electric wire 1, when a scrape abrasion test defined by ISO 6722:2006 is conducted on the electric wire in which a thickness of the electrical insulation coating layer 3 is 0.25 to 0.40±0.05 mm in test conditions that a needle whose diameter is 0.45±0.01 mm is used and a vertical force of 2±0.05 N is applied under an atmosphere at 120±1° C., the number of cycles of reciprocating movement is five or more. The electrical insulation coating layer 3 according to the present embodiment contains the lanthanoid containing compound. Consequently, it is possible to secure a high temperature abrasion resistance for a long period of time, and provide a good electrical insulation property even when the vehicle electric wire is used in high temperature environment.

Generally, a (thermoplastic) resin composition composing a coating member has a feature that a temperature significantly fluctuates an elastic modulus of a material. That is, the elastic modulus is high at a low temperature, and is low at a high temperature. Hence, a composition of an electric wire used for a vehicle wire harness is designed to withstand heat caused by operating an engine and vibration caused by driving. Furthermore, generally, for the vehicle electric wire, the elastic modulus and the high temperature scrape characteristics of the coating member are checked. Even in a case of an electric wire for which a polyvinyl chloride is used according to the present embodiment, it is necessary to take into account the elastic modulus and the high temperature scrape characteristics to secure safety of the electric wire. That is, the vehicle electric wire needs to have the elastic modulus and the high temperature scrape characteristics corresponding to a conventionally used vehicle cross-linked polyethylene electric wire. Hence, the electrical insulation coating layer 3 of the vehicle electric wire 1 according to the present embodiment preferably has the above storage modulus and high temperature scrape characteristics.

The vehicle electric wire 1 according to the present embodiment preferably has a heat aging resistance of 125° C. as heat aging defined by ISO6722:2006. That is, when an aging test is conducted at 125±3° C. for 3000 hours for the vehicle electric wire 1 in accordance with ISO6722:2006, and then a withstand voltage test is conducted at 1 kV for one minute, an electrical conductor is preferably not exposed and broken down.

Furthermore, the vehicle electric wire 1 according to the present embodiment preferably has a heat resistance of 120° C. as a heat resistance defined by JASO D618 (Automotive parts—Test methods for unscreened low-voltage cables). That is, the electrical conductor is first pulled out from the electric wire, and an aging test is conducted at 120° C. for the electrical insulation coating layer which has been made tubular. Next, when stretched at 200 m/min, the electrical insulation coating layer subjected to the aging test can preferably secure a stretch equal to or more than 100% for 10000 hours or more. In addition, the stretch evaluation may be an evaluation based on an Arrhenius model.

Next, a method for manufacturing the vehicle electric wire 1 according to the present embodiment will be described. The electrical insulation coating layer 3 of the vehicle electric wire 1 is prepared by heating and kneading the above material. In this regard, a known method can be used for this preparation method. By, for example, kneading the above material by using a known kneader such as a Banbury mixer, a pressuring kneader, a kneading extruder, a twin screw extruder or a roll mill, it is possible to obtain the resin composition which composes the electrical insulation coating layer 3. Furthermore, the above material may be dry-blended by using a tumbler in advance, and then kneaded by using the above kneader. In addition, after heating and kneading, the material is taken out from the kneader and the resin composition is obtained. In this case, the resin composition may be molded into a pellet shape by a pelletizer.

Furthermore, according to the method for manufacturing the vehicle electric wire 1, known means can be also used for a method for coating the electrical conductor 2 with the electrical insulation coating layer 3. For example, the electrical insulation coating layer 3 can be formed by a general extrusion molding method. Furthermore, as an extruder used in the extrusion molding method, a single screw extruder and a twin screw extruder may be used, and an extruder including a screw, a breaker plate, a crosshead, a distributor, a nipple and dies can be used.

According to a specific method for manufacturing the vehicle electric wire 1, the vinyl chloride resin is first put in the twin screw extruder set to a temperature at which the vinyl chloride resin sufficiently melts. In this case, in addition to the plasticizer and the lanthanoid containing compound, the above additive is put if necessary. Furthermore, the vinyl chloride resin is melted and kneaded by a screw, and a certain amount of the vinyl chloride resin is supplied to the crosshead via the breaker plate. The melted vinyl chloride resin is caused to flow onto a circumference of the nipple by the distributor, and is extruded by the dies in a state where the vinyl chloride resin is coated on an outer circumference of the electrical conductor. Consequently, it is possible to obtain the electrical insulation coating layer 3 which coats the outer circumference of the electrical conductor 2. In addition, a processing temperature for obtaining the electrical insulation coating layer 3 differs depending on a mixture of the material, and is, for example, 170 to 220° C.

Thus, the vehicle electric wire 1 according to the present embodiment includes the electrical insulation coating layer 3 which contains the vinyl chloride resin, the plasticizer and the compound containing the lanthanoid; and the electrical conductor 2 which is coated with the electrical insulation coating layer 3. In the electrical insulation coating layer 3, the content of the plasticizer with respect to 100 parts by mass of the vinyl chloride resin is 25 parts by mass or more and less than 50 parts by mass. Furthermore, when dynamic viscoelasticity measurement using a dynamic viscoelasticity measurement device is performed on the electrical insulation coating layer 3 at 0.5 Hz in frequency and under a temperature rise condition of 2° C./minute in temperature rise speed in a single cantilever measurement mode, a storage modulus at 140° C. is 0.1 MPa or more. Consequently, it is possible to secure a high heat resistance for a long period of time, and provide a good electrical insulation property even when the vehicle electric wire is used in high temperature environment.

The present invention uses a polyvinyl chloride having an appropriate mixture and, consequently, can obtain the resin composition at low cost, and the resin composition has an elastic modulus exceeding a certain level under high temperature environment. That is, the polyvinyl chloride generally has an insufficient heat resistance for a polyethylene resin in terms of material characteristics. However, a necessary heat resistance is secured by adding the lanthanoid containing compound and making a contrivance on the content of the plasticizer. Furthermore, when the polyvinyl chloride is processed into a wire harness, a feature of the polyvinyl chloride makes it possible to prevent the coating layer from being torn when an electric wire terminal is peeled, and reduce the rest of the coating layer remaining between the electrical conductors with respect to the polyethylene resin.

The resin composition having a good heat resistance forms the electrical insulation coating layer 3, so that the vehicle electric wire 1 according to the present embodiment can be used in any of an upper portion of an internal combustion engine, a vicinity of an exhaust gas flow path in which an exhaust gas circulates after a fuel is combusted, and a circuit around a power supply. Furthermore, the vehicle electric wire 1 can be arranged near a motor or a converter which is a high temperature part. As a result, the vehicle electric wire 1 can be suitably used for a vehicle such as an electric vehicle.

The wire harness according to the present embodiment includes the above vehicle electric wire 1. As described above, the vehicle electric wire 1 according to the present embodiment has a higher heat resistance than the conventional wire. Consequently, the vehicle electric wire 1 can be preferably used for a vehicle wire harness for which a high heat resistance, strength and conductivity are demanded.

Figure 3A:
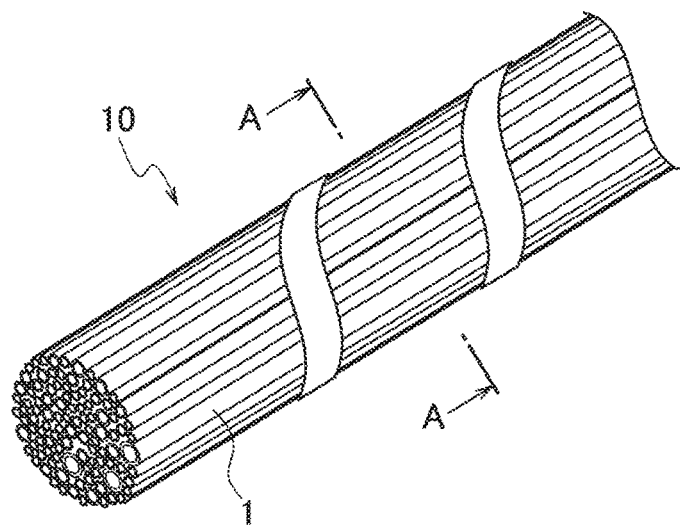
FIGS. 3A and 3B are schematic views illustrating a wire harness according to the embodiment of the present invention.
Figure 3B:
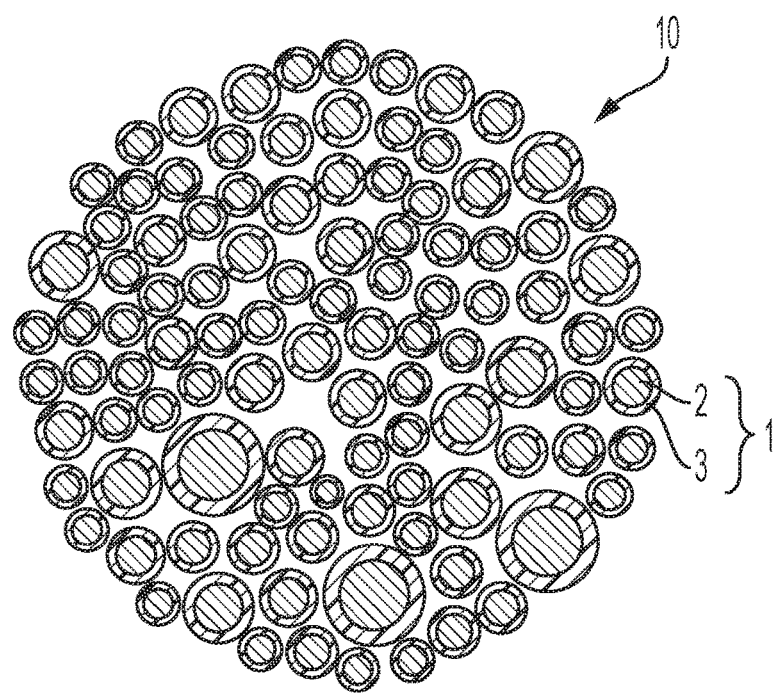

As illustrated in FIGS. 3A and 3B, a wire harness 10 according to the present embodiment may be formed by bundling a plurality of electric wires having different cross-sectional areas of the electrical conductors 2 and different thicknesses of the electrical insulation coating layer 3. In this case, the electrical insulation coating layer 3 preferably becomes thicker as the cross-sectional area of the electrical conductor 2 becomes larger. Furthermore, the vehicle electric wire 1 according to the present embodiment is preferably arranged at a portion on a routing path for which a heat resistance equal to or more than 120° C. is demanded, in the electric wire which constitutes the wire harness 10. As described above, the vehicle electric wire 1 according to the present embodiment can secure a high heat resistance for a long period of time, can obtain a good electrical insulation property even when used in the high temperature environment, and consequently can be suitably used for a high temperature portion of 120° C. or more.

The wire harness according to the present embodiment may be formed by bundling a plurality of the vehicle electric wires 1 according to the present embodiment whose main component is the vinyl chloride resin as the electrical insulation coating layer, and a plurality of electric wires whose main component is the crosslinked polyethylene resin as the electrical insulation coating layer. Similar to the vehicle electric wire 1 according to the present embodiment, the electric wires whose main component is the crosslinked polyethylene resin as the electrical insulation coating layer also have a high heat resistance. Consequently, the wire harness formed by bundling the vehicle electric wires 1 and these electric wires can also secure a high heat resistance. In this regard, when the vinyl chloride resin and the crosslinked polyethylene resin contact for a long period of time by bundling the vehicle electric wires and these electric wires, transfer of the plasticizer contained in the polyvinyl chloride to the neighboring crosslinked polyethylene resin causes a phenomenon that deterioration of the crosslinked polyethylene resin advances at a high temperature occurs. Hence, a use amount of the crosslinked polyethylene electric wire is preferably small for the wire harness according to the present embodiment. Even when the use amount of the crosslinked polyethylene electric wire is made small, the vehicle electric wire 1 according to the present embodiment has a high heat resistance as described above, and consequently can secure the heat resistance of the wire harness to be obtained.

Hereinafter, the present invention will be described in more detail by using examples and comparative examples. However, the present invention is not limited to these examples.

Examples 1

First, the following vinyl chloride resin, plasticizer, stabilizer, lanthanoid containing compound and filler were melted and kneaded at the contents illustrated in Table 1 to Table 6 by using the kneader to prepare a resin composition according to each of the examples and the comparative examples. In addition, the contents of the vinyl chloride resin, the plasticizer, the stabilizer, the lanthanoid containing compound and the filler illustrated in Table 1 to Table 6 are all described as "parts by mass".

(Vinyl Chloride Resin)
  Polyvinyl chloride made by Shin-Etsu Chemical Co., Ltd. product name: TH1700 (weight average degree of polymerization 1700)
  Polyvinyl chloride made by Shin-Etsu Chemical Co., Ltd. product name: TH3000 (weight average degree of polymerization 3000)
(Plasticizer)
  Phthalate plasticizer made by New Japan Chemical Co., Ltd. product name: SANSO CIZER DUP (diundecyl phthalate)
  Trimellitic acid plasticizer made by ADEKA Corporation product name: ADK CIZER (registered trademark) C-9N (trimellitic acid isononyl ester)
  Pyromellitic acid plasticizer made by ADEKA Corporation product name: ADK CIZER (registered trademark) UL-100 (pyromellitic acid mixture linear alkyl ester)
(Stabilizer)
  Ca/Mg/Zn-based vinyl chloride stabilizer made by ADEKA Corporation product name: ADK STAB (registered trademark) RUP-110
(Lanthanoid Containing Compound)
  Lanthanum oxide made by Toyotsu Rare Earths Corporation
(Filler)
  Calcium carbonate (surface treatment has been finished by using a rosin acid and a lignin acid) made by SHIRAISHI CALCIUM KAISHA, LTD. product name: Calmos (registered trademark)

Next, a copper core wire whose cross-sectional area was 1.8 $mm^2$ was prepared as the metal electrical conductor. Furthermore, the resin composition was extruded and molded around the metal electrical conductor under a temperature condition of approximately 170 to 220° C. by using an electric wire manufacturing extrusion coating device to make an electric wire test sample coated with the resin composition according to each of the examples and the comparative examples. In addition, during extrusion and molding, the thickness of the electrical insulation coating layer after coating was adjusted to 0.35 mm.

TABLE 1

| | Example 1-1-1 | Example 1-1-2 | Example 1-1-3 | Example 1-1-4 | Comparative Example 1-1-1 | Example 1-1-5 | Example 1-1-6 | Example 1-1-7 | Example 1-1-8 | Example 1-1-9 | EExample 1-1-10 | Example 1-1-11 |
|---|---|---|---|---|---|---|---|---|---|---|---|---|
| Vinyl Chloride Resin (average degree of polymerization 1700) | — | — | — | — | — | — | — | — | — | — | — | — |
| Vinyl Chloride Resin (average degree of polymerization 3000) | 100 | 100 | 100 | 100 | 100 | 100 | 100 | 100 | 100 | 100 | 100 | 100 |
| Plasticizer (Phthalate) | — | — | — | — | — | — | — | — | 5 | — | — | — |
| Plasticizer (Trimellitic acid) | — | — | — | — | — | 25 | 35 | 40 | 35 | 30 | 20 | 10 |
| Plasticizer (Pyromellitic acid) | 25 | 35 | 40 | 49 | 50 | — | — | — | — | 10 | 20 | 30 |
| Stabilizer | 5 | 5 | 5 | 5 | 5 | 5 | 5 | 5 | 5 | 5 | 5 | 5 |
| Lanthanum oxide | 5 | 5 | 5 | 5 | 5 | 5 | 5 | 5 | 5 | 5 | 5 | 5 |
| Filler | 5 | 5 | 5 | 5 | 5 | 5 | 5 | 5 | 5 | 5 | 5 | 5 |
| Storage Modulus | ○ | ○ | ○ | ○ | X | ○ | ○ | ○ | ○ | ○ | ○ | ○ |
| High Temperature | ◎ | ◎ | ○ | ○ | X | ◎ | ◎ | ○ | ○ | ○ | ○ | ○ |

TABLE 1-continued

|  | Example 1-1-1 | Example 1-1-2 | Example 1-1-3 | Example 1-1-4 | Comparative Example 1-1-1 | Example 1-1-5 | Example 1-1-6 | Example 1-1-7 | Example 1-1-8 | Example 1-1-9 | EExample 1-1-10 | Example 1-1-11 |
|---|---|---|---|---|---|---|---|---|---|---|---|---|
| Abrasion Resistance |  |  |  |  |  |  |  |  |  |  |  |  |
| Peeling Property | ◯ | ◯ | ◯ | ◯ | ◯ | ◯ | ◯ | ◯ | ◯ | ◯ | ◯ | ◯ |
| Long-Term Heat Resistance | ◯ | ◯ | ◯ | ◯ | ◯ | ◯ | ◯ | ◯ | ◯ | ◯ | ◯ | ◯ |
| Material Processability | ◎ | ◎ | ◎ | ◎ | ◎ | ◎ | ◎ | ◎ | ◎ | ◎ | ◎ | ◎ |

TABLE 2

|  | Example 1-2-1 | Example 1-2-2 | Example 1-2-3 | Example 1-2-4 | Comparative Example 1-2-1 | Example 1-2-5 | Example 1-2-6 | Example 1-2-7 | Example 1-2-8 | Example 1-2-9 | Example 1-2-10 | Example 1-2-11 |
|---|---|---|---|---|---|---|---|---|---|---|---|---|
| Vinyl Chloride Resin (average degree of polymerization 1700) | — | — | — | — | — | — | — | — | — | — | — | — |
| Vinyl Chloride Resin (average degree of polymerization 3000) | 100 | 100 | 100 | 100 | 100 | 100 | 100 | 100 | 100 | 100 | 100 | 100 |
| Plasticizer (Phthalate) | — | — | — | — | — | — | — | — | 5 | — | — | — |
| Plasticizer (Trimellitic acid) | — | — | — | — | — | 25 | 35 | 40 | 35 | 30 | 20 | 10 |
| Plasticizer (Pyromellitic acid) | 25 | 35 | 40 | 49 | 50 | — | — | — | — | 10 | 20 | 30 |
| Stabilizer | 5 | 5 | 5 | 5 | 5 | 5 | 5 | 5 | 5 | 5 | 5 | 5 |
| Lanthanum oxide | 10 | 10 | 10 | 10 | 10 | 10 | 10 | 10 | 10 | 10 | 10 | 10 |
| Filler | 5 | 5 | 5 | 5 | 5 | 5 | 5 | 5 | 5 | 5 | 5 | 5 |
| Storage Modulus | ◯ | ◯ | ◯ | ◯ | X | ◯ | ◯ | ◯ | ◯ | ◯ | ◯ | ◯ |
| High Temperature Abrasion Resistance | ◎ | ◎ | ◯ | ◯ | X | ◎ | ◎ | ◯ | ◯ | ◯ | ◯ | ◯ |
| Peeling Property | ◯ | ◯ | ◯ | ◯ | ◯ | ◯ | ◯ | ◯ | ◯ | ◯ | ◯ | ◯ |
| Long-Term Heat Resistance | ◯ | ◯ | ◯ | ◯ | ◯ | ◯ | ◯ | ◯ | ◯ | ◯ | ◯ | ◯ |
| Material Processability | ◎ | ◎ | ◎ | ◎ | ◎ | ◎ | ◎ | ◎ | ◎ | ◎ | ◎ | ◎ |

TABLE 3

|  | Example 1-3-1 | Example 1-3-2 | Example 1-3-3 | Example 1-3-4 | Comparative Example 1-3-1 | Example 1-3-5 | Example 1-3-6 | Example 1-3-7 | Example 1-3-8 | Example 1-3-9 | Example 1-3-10 | Example 1-3-11 |
|---|---|---|---|---|---|---|---|---|---|---|---|---|
| Vinyl Chloride Resin (average degree of polymerization 1700) | — | — | — | — | — | — | — | — | — | — | — | — |
| Vinyl Chloride Resin (average degree of polymerization 3000) | 100 | 100 | 100 | 100 | 100 | 100 | 100 | 100 | 100 | 100 | 100 | 100 |
| Plasticizer (Phthalate) | — | — | — | — | — | — | — | — | 5 | — | — | — |
| Plasticizer (Trimellitic acid) | — | — | — | — | — | 25 | 35 | 40 | 35 | 30 | 20 | 10 |
| Plasticizer (Pyromellitic acid) | 25 | 35 | 40 | 49 | 50 | — | — | — | — | 10 | 20 | 30 |
| Stabilizer | 10 | 10 | 10 | 10 | 10 | 10 | 10 | 10 | 10 | 10 | 10 | 10 |
| Lanthanum oxide | 5 | 5 | 5 | 5 | 5 | 5 | 5 | 5 | 5 | 5 | 5 | 5 |
| Filler | 5 | 5 | 5 | 5 | 5 | 5 | 5 | 5 | 5 | 5 | 5 | 5 |
| Storage Modulus | ◯ | ◯ | ◯ | ◯ | X | ◯ | ◯ | ◯ | ◯ | ◯ | ◯ | ◯ |
| High Temperature | ◎ | ◎ | ◯ | ◯ | X | ◎ | ◎ | ◯ | ◯ | ◯ | ◯ | ◯ |

TABLE 3-continued

|  | Example 1-3-1 | Example 1-3-2 | Example 1-3-3 | Example 1-3-4 | Comparative Example 1-3-1 | Example 1-3-5 | Example 1-3-6 | Example 1-3-7 | Example 1-3-8 | Example 1-3-9 | Example 1-3-10 | Example 1-3-11 |
|---|---|---|---|---|---|---|---|---|---|---|---|---|
| Abrasion Resistance |  |  |  |  |  |  |  |  |  |  |  |  |
| Peeling Property | ○ | ○ | ○ | ○ | ○ | ○ | ○ | ○ | ○ | ○ | ○ | ○ |
| Long-Term Heat Resistance | ○ | ○ | ○ | ○ | ○ | ○ | ○ | ○ | ○ | ○ | ○ | ○ |
| Material Processability | ○ | ○ | ○ | ○ | ○ | ○ | ○ | ○ | ○ | ○ | ○ | ○ |

TABLE 4

|  | Example 1-4-1 | Example 1-4-2 | Example 1-4-3 | Example 1-4-4 | Comparative Example 1-4-1 | Example 1-4-5 | Example 1-4-6 | Example 1-4-7 | Example 1-4-8 | Example 1-4-9 | Example 1-4-10 | Example 1-4-11 |
|---|---|---|---|---|---|---|---|---|---|---|---|---|
| Vinyl Chloride Resin (average degree of polymerization 1700) | — | — | — | — | — | — | — | — | — | — | — | — |
| Vinyl Chloride Resin (average degree of polymerization 3000) | 100 | 100 | 100 | 100 | 100 | 100 | 100 | 100 | 100 | 100 | 100 | 100 |
| Plasticizer (Phthalate) | — | — | — | — | — | — | — | — | 5 | — | — | — |
| Plasticizer (Trimellitic acid) | — | — | — | — | — | 25 | 35 | 40 | 35 | 30 | 20 | 10 |
| Plasticizer (Pyromellitic acid) | 25 | 35 | 40 | 49 | 50 | — | — | — | — | 10 | 20 | 30 |
| Stabilizer | 15 | 15 | 15 | 15 | 15 | 15 | 15 | 15 | 15 | 15 | 15 | 15 |
| Lanthanum oxide | 5 | 5 | 5 | 5 | 5 | 5 | 5 | 5 | 5 | 5 | 5 | 5 |
| Filler | 5 | 5 | 5 | 5 | 5 | 5 | 5 | 5 | 5 | 5 | 5 | 5 |
| Storage Modulus | ○ | ○ | ○ | ○ | X | ○ | ○ | ○ | ○ | ○ | ○ | ○ |
| High Temperature Abrasion Resistance | ◉ | ◉ | ○ | ○ | X | ◉ | ◉ | ○ | ○ | ○ | ○ | ○ |
| Peeling Property | ○ | ○ | ○ | ○ | ○ | ○ | ○ | ○ | ○ | ○ | ○ | ○ |
| Long-Term Heat Resistance | ○ | ◉ | ◉ | ◉ | ◉ | ○ | ◉ | ◉ | ◉ | ◉ | ◉ | ◉ |
| Material Processability | X | X | X | ○ | ○ | ○ | ○ | ○ | ○ | ○ | ○ | X |

TABLE 5

|  | Example 1-5-1 | Example 1-5-2 | Example 1-5-3 | Example 1-5-4 | Comparative Example 1-5-1 | Example 1-5-5 | Example 1-5-6 | Example 1-5-7 | Example 1-5-8 | Example 1-5-9 | Example 1-5-10 | Example 1-5-11 |
|---|---|---|---|---|---|---|---|---|---|---|---|---|
| Vinyl Chloride Resin (average degree of polymerization 1700) | — | — | — | — | — | — | — | — | — | — | — | — |
| Vinyl Chloride Resin (average degree of polymerization 3000) | 100 | 100 | 100 | 100 | 100 | 100 | 100 | 100 | 100 | 100 | 100 | 100 |
| Plasticizer (Phthalate) | — | — | — | — | — | — | — | — | 5 | — | — | — |
| Plasticizer (Trimellitic acid) | — | — | — | — | — | 25 | 35 | 40 | 35 | 30 | 20 | 10 |
| Plasticizer (Pyromellitic acid) | 25 | 35 | 40 | 49 | 50 | — | — | — | — | 10 | 20 | 30 |
| Stabilizer | 5 | 5 | 5 | 5 | 5 | 5 | 5 | 5 | 5 | 5 | 5 | 5 |
| Lanthanum oxide | 15 | 15 | 15 | 15 | 15 | 15 | 15 | 15 | 15 | 15 | 15 | 15 |
| Filler | 5 | 5 | 5 | 5 | 5 | 5 | 5 | 5 | 5 | 5 | 5 | 5 |
| Storage Modulus | ○ | ○ | ○ | ○ | X | ○ | ○ | ○ | ○ | ○ | ○ | ○ |
| High Temperature | ◉ | ◉ | ○ | ○ | X | ◉ | ◉ | ○ | ○ | ○ | ○ | ○ |

TABLE 5-continued

|  | Example 1-5-1 | Example 1-5-2 | Example 1-5-3 | Example 1-5-4 | Comparative Example 1-5-1 | Example 1-5-5 | Example 1-5-6 | Example 1-5-7 | Example 1-5-8 | Example 1-5-9 | Example 1-5-10 | Example 1-5-11 |
|---|---|---|---|---|---|---|---|---|---|---|---|---|
| Abrasion Resistance |  |  |  |  |  |  |  |  |  |  |  |  |
| Peeling Property | ○ | ○ | ○ | ○ | ○ | ○ | ○ | ○ | ○ | ○ | ○ | ○ |
| Long-Term Heat Resistance | ○ | ○ | ○ | ○ | ○ | ○ | ○ | ○ | ○ | ○ | ○ | ○ |
| Material Processability | ◎ | ◎ | ◎ | ◎ | ◎ | ◎ | ◎ | ◎ | ◎ | ◎ | ◎ | ◎ |

TABLE 6

|  | Example 1-6-1 | Example 1-6-2 | Example 1-6-3 | Example 1-6-4 | Comparative Example 1-6-1 | Example 1-6-5 | Example 1-6-6 | Example 1-6-7 | Example 1-6-8 | Example 1-6-9 | Example 1-6-10 | Example 1-6-11 | Example 1-6-12 |
|---|---|---|---|---|---|---|---|---|---|---|---|---|---|
| Vinyl Chloride Resin (average degree of polymerization 1700) | 100 | 100 | 100 | 100 | 100 | — | — | — | — | — | — | — | — |
| Vinyl Chloride Resin (average degree of polymerization 3000) | — | — | — | — | — | 100 | 100 | 100 | 100 | 100 | 100 | 100 | 100 |
| Plasticizer (Phthalate) | — | — | — | — | — | — | — | — | — | — | — | — | — |
| Plasticizer (Trimellitic acid) | 25 | 35 | 40 | 49 | 50 | — | — | — | — | 35 | 40 | 35 | 40 |
| Plasticizer (Pyromellitic acid) | — | — | — | — | — | 35 | 35 | 35 | 40 | — | — | — | — |
| Stabilizer | 5 | 5 | 5 | 5 | 5 | 2 | 2 | 10 | 11 | 5 | 5 | 7 | 7 |
| Lanthanum oxide | 5 | 5 | 5 | 5 | 5 | 2 | 3 | 10 | 11 | 5 | 5 | 8 | 8 |
| Filler | 5 | 5 | 5 | 5 | 5 | 5 | 5 | 5 | 5 | 5 | 5 | 5 | 5 |
| Storage Modulus | ○ | ○ | ○ | ○ | X | ○ | ○ | ○ | ○ | ○ | ○ | ○ | ○ |
| High Temperature Abrasion Resistance | ◎ | ◎ | ○ | ○ | ○ | ◎ | ◎ | ◎ | ○ | ◎ | ○ | ◎ | ○ |
| Peeling Property | ○ | ○ | ○ | ○ | ○ | ○ | ○ | ○ | ○ | ○ | ○ | ○ | ○ |
| Long-Term Heat Resistance | ○ | ○ | ○ | ○ | ○ | X | ○ | ○ | ○ | ○ | ○ | ○ | ○ |
| Material Processability | ◎ | ◎ | ◎ | ◎ | ◎ | ◎ | ◎ | ○ | ○ | ◎ | ◎ | ◎ | ◎ |

[Evaluation]

The resin compositions and the electric wire test samples according to the examples and the comparative examples were evaluated regarding the storage modulus, the high temperature abrasion resistance, the peeling property, the long-term heat resistance and the material processability by the following method. Each evaluation result is illustrated in Table 1 to Table 6.

<Storage Modulus>

First, the resin compositions according to the examples and the comparative examples obtained as described above were processed to have a sheet shape by using an electric heating roll whose surface temperature was 200° C. Next, the obtained sheet was pressurized by an electric heating press at 210° C. for five minutes by using a metal framework, and molded so as to have the thickness of 1±0.2 mm. After pressurizing and molding, the sheet was immediately cooled by a press including a water cooling mechanism. Furthermore, the made press sheet was processed to a strip-shape test piece of 6±0.2 mm long, 38±2 mm wide and 1±0.2 mm thick.

Next, the storage moduli of the obtained test pieces was measured by using the dynamic viscoelasticity measurement device. That is, dynamic viscoelasticity measurement was performed on the test pieces at 0.5 Hz in frequency and under a temperature rise condition of 2° C./minute in temperature rise speed in a single cantilever measurement mode to measure the storage moduli at 140° C. Furthermore, the test piece having the storage modulus equal to or more than 0.1 MPa was evaluated as "○". The test piece having the storage modulus less than 0.1 MPa was evaluated as "x".

<High Temperature Abrasion Resistance>

In accordance with scrape abrasion standards of ISO6722: 2006, an abrasion test was conducted on the obtained electric wire test sample according to each example. In the abrasion test, a needle whose diameter was 0.45±0.01 mm was used as an abrasive element. In addition, according to this test, in conditions that a vertical force of 2±0.05 N was applied to the electric wire test sample under the atmosphere at 120±1° C., the abrasive element was repeatedly slid on the electrical insulation coating layer to measure the number of cycles of scrapes until the metal electrical conductor and the needle conducted. The abrasion test was conducted at four portions of one electric wire sample, and when a measurement portion was changed, the electric wire was rotated about a longitudinal direction by 90°. That is, the abrasion test was conducted for one electric wire test sample from 360°. Furthermore, when results obtained by measuring the four portions were regarded as one group, the smallest numerical value among the numbers of cycles of scrapes in this group was used as determination data of the electric wire test sample. A case where the number of cycles of scrapes of the determination data was 10 times or more, yet the metal electrical conductor and the needle did not conduct was evaluated as "⊙". A case where the number of cycles of scrapes was five times or more and less than 10, and the metal electrical conductor and the needle conducted was evaluated as "○". In addition, a case where the number of cycles of scrapes was less than five times, and the metal electrical conductor and the needle conducted was evaluated as "x".

<Peeling Property>

Part of the electrical insulation coating layer was peeled by using an electric wire peeler for the obtained electric wire test sample according to each example. In this case, a case where the end surface of the electrical insulation coating layer is completely peeled without tearing the end surface was evaluated as "○". A case where the end surface of the electrical insulation coating layer was torn and part of the end surface remained was evaluated as "x".

<Long-Term Heat Resistance>

For the obtained electric wire test sample according to each example, an aging test was conducted at 125±3° C. for 3000 hours in accordance with ISO6722:2006, and then a withstand voltage test was conducted at 1 kV for one minute. A case where exposure of the electrical conductor could not be visually confirmed, electricity did not leak during the withstand voltage test and an appearance of the electric wire test sample did not change was evaluated as "⊙". A case where the exposure of the electrical conductor could not be visually confirmed, and the electricity did not leak during the withstand voltage test was evaluated as "○". A case where the exposure of the electrical conductor was confirmed or the electricity leaked was evaluated as "x".

<Material Processability>

When the resin compositions according to the examples and the comparative examples were manufactured by a batch kneading machine, the resin composition having excellent gelation characteristics was evaluated as "○". Furthermore, a resin composition having slightly poor gelation characteristics was evaluated as "x". That is, with regard to the batch kneading machine, two metal rolls whose surface temperatures were 200° C. were rotated at 14 rpm and 17 rpm, and a clearance between the metal rolls was adjusted to 1 mm. Furthermore, when the vinyl chloride resin, the plasticizer, the stabilizer, the lanthanoid containing compound and the filler were kneaded by using this batch kneading machine to prepare a compound, a time taken until the materials gelated and wound around the metal rolls after these materials were put in the metal rolls was measured. A case where the time taken until the materials wound around the metal rolls was less than four minutes was evaluated as "⊙". A case where the time was four minutes or more and less than six minutes was evaluated as "○". A case where the time was six minutes or more was evaluated as "x".

It is found from Table 1 to Table 6 that, when the electrical insulation coating layer contains lanthanum oxide, and the content of the plasticizer with respect to 100 parts by mass of the vinyl chloride resin is 25 parts by mass or more and less than 50 parts by mass, the storage modulus at 140° C. is 0.1 MPa or more. Furthermore, the electrical insulation coating layer also has an excellent high temperature abrasion resistance and peeling property.

In addition, according to Examples 1-4-1 to 1-4-11, when the content of the stabilizer is 15 parts by mass or more with respect to 100 parts by mass of the vinyl chloride resin, a high storage modulus and a high temperature abrasion resistance can be obtained, yet the material processability lowers in some cases. Hence, the content of the stabilizer is preferably 10 parts by mass or less with respect to 100 parts by mass of the vinyl chloride resin.

Furthermore, according to Examples 1-6-5 and 1-6-6, when the content of lanthanum oxide is 2 parts by mass or less with respect to 100 parts by mass of the vinyl chloride resin, the high storage modulus and the high temperature abrasion resistance can be obtained, yet the long-term heat resistance lowers. Hence, the content of lanthanum oxide is preferably 3 parts by mass or more with respect to 100 parts by mass of the vinyl chloride resin.

Examples 2

First, the following vinyl chloride resin, plasticizer, stabilizer, lanthanoid containing compound and filler were melted and kneaded at the contents illustrated in Table 7 to Table 12 by using the kneader to prepare a resin composition according to each of the examples and the comparative examples. In addition, the contents of the vinyl chloride resin, the plasticizer, the stabilizer, the lanthanoid containing compound and the filler illustrated in Table 7 to Table 12 are all described as "parts by mass".

(Vinyl Chloride Resin)

Polyvinyl chloride made by Shin-Etsu Chemical Co., Ltd. product name: TK2500PE (weight average degree of polymerization 3000)

Polyvinyl chloride made by Shin-Etsu Chemical Co., Ltd. product name: TK2000E (weight average degree of polymerization 2000)

(Plasticizer)

Plasticizer A made by Kao Corporation product name: TRIMEX (registered trademark) N-08 (trimellitic acid tri-normal alkyl ester (linear C8, C10))

Plasticizer B made by New Japan Chemical Co., Ltd. product name: TL9TM (trimellitic acid plasticizer (linear C9))

(Stabilizer)

Ca/Mg/Zn-based vinyl chloride stabilizer made by ADEKA Corporation product name: ADK STAB (registered trademark) RUP-110 (containing hydrotalcite)

(Lanthanoid Containing Compound)

Lanthanum oxide made by Toyotsu Rare Earths Corporation (Filler)

Calcium carbonate made by SHIRAISHI CALCIUM KAISHA, LTD. product name: Vigot (registered trademark) 10

Next, a copper core wire whose cross-sectional area was 1.8 mm$^2$ was prepared as the metal electrical conductor. Furthermore, the resin composition was extruded and molded around the metal electrical conductor under the temperature condition of approximately 170 to 220° C. by using the electric wire manufacturing extrusion coating device to make an electric wire test sample coated with the resin composition according to each of the examples and the comparative examples. In addition, during extrusion and molding, the thickness of the electrical insulation coating layer after coating was adjusted to 0.35 mm.

TABLE 7

|  | Example 2-1 | Example 2-2 | Example 2-3 | Example 2-4 | Example 2-5 | Example 2-6 | Example 2-7 | Example 2-8 |
|---|---|---|---|---|---|---|---|---|
| Vinyl Chloride Resin (average degree of polymerization 2000) | — | — | — | — | — | — | — | — |
| Vinyl Chloride Resin (average degree of polymerization 3000) | 100 | 100 | 100 | 100 | 100 | 100 | 100 | 100 |
| Plasticizer A | 40 | 40 | 40 | 40 | 40 | 40 | 30 | 30 |
| Plasticizer B | — | — | — | — | — | — | — | — |
| Stabilizer | 5 | 5 | 5 | 5 | 10 | 10 | 10 | 10 |
| Lanthanum oxide | 15 | 10 | 5 | 1 | 15 | 10 | 5 | 1 |
| Filler | 5 | 5 | 5 | 5 | 5 | 5 | 5 | 5 |
| Storage Modulus | ○ | ○ | ○ | ○ | ○ | ○ | ○ | ○ |
| High Temperature Abrasion Resistance | ○ | ○ | ○ | ○ | ○ | ○ | ◎ | ◎ |
| Peeling Property | ○ | ○ | ○ | ○ | ○ | ○ | ○ | ○ |
| Long-Term Heat Resistance | ○ | ○ | ○ | ○ | ○ | ○ | ○ | ○ |
| Abrasion Resistance | ◎ | ◎ | ◎ | ◎ | ○ | ◎ | ◎ | ◎ |
| Material Processability | ◎ | ◎ | ◎ | ◎ | ○ | ○ | ○ | ○ |

TABLE 8

|  | Example 2-9 | Example 2-10 | Example 2-11 | Example 2-12 | Example 2-13 | Example 2-14 | Example 2-15 | Example 2-16 |
|---|---|---|---|---|---|---|---|---|
| Vinyl Chloride Resin (average degree of polymerization 2000) | — | — | — | — | — | — | — | — |
| Vinyl Chloride Resin (average degree of polymerization 3000) | 100 | 100 | 100 | 100 | 100 | 100 | 100 | 100 |
| Plasticizer A | 40 | 40 | 40 | 40 | 20 | 35 | 40 | 49 |
| Plasticizer B | — | — | — | — | — | — | — | — |
| Stabilizer | 15 | 15 | 15 | 15 | 15 | 15 | 15 | 15 |
| Lanthanum oxide | 15 | 10 | 5 | 1 | 5 | 5 | 5 | 5 |
| Filler | 5 | 5 | 5 | 5 | 5 | 5 | 5 | 5 |
| Storage Modulus | ○ | ○ | ○ | ○ | ○ | ○ | ○ | ○ |
| High Temperature Abrasion Resistance | ○ | ○ | ○ | ○ | ◎ | ◎ | ○ | ○ |
| Peeling Property | ○ | ○ | ○ | ○ | ○ | ○ | ○ | ○ |
| Long-Term Heat Resistance | ○ | ○ | ○ | ○ | ○ | ○ | ○ | ○ |
| Abrasion Resistance | ○ | ○ | ○ | ◎ | ◎ | ◎ | ○ | ○ |
| Material Processability | ○ | ○ | ○ | ○ | ○ | ○ | ○ | ○ |

TABLE 9

|  | Example 2-17 | Example 2-18 | Example 2-19 | Example 2-20 | Example 2-21 | Example 2-22 | Example 2-23 |
|---|---|---|---|---|---|---|---|
| Vinyl Chloride Resin (average degree of polymerization 2000) | — | — | — | — | — | — | — |
| Vinyl Chloride Resin (average degree of polymerization 3000) | 100 | 100 | 100 | 100 | 100 | 100 | 100 |
| Plasticizer A | — | — | — | — | 10 | 25 | 20 |
| Plasticizer B | 20 | 35 | 40 | 49 | 25 | 10 | 20 |
| Stabilizer | 15 | 15 | 15 | 15 | 15 | 15 | 15 |
| Lanthanum oxide | 5 | 5 | 5 | 5 | 5 | 5 | 5 |
| Filler | 5 | 5 | 5 | 5 | 5 | 5 | 5 |
| Storage Modulus | ○ | ○ | ○ | ○ | ○ | ○ | ○ |
| High Temperature | ◎ | ◎ | ○ | ○ | ◎ | ◎ | ○ |

TABLE 9-continued

|  | Example 2-17 | Example 2-18 | Example 2-19 | Example 2-20 | Example 2-21 | Example 2-22 | Example 2-23 |
|---|---|---|---|---|---|---|---|
| Abrasion Resistance Peeling Property | ○ | ○ | ○ | ○ | ○ | ○ | ○ |
| Long-Term Heat Resistance | ○ | ○ | ○ | ○ | ○ | ○ | ○ |
| Abrasion Resistance | ◎ | ◎ | ○ | ○ | ◎ | ◎ | ○ |
| Material Processability | ○ | ○ | ○ | ○ | ○ | ○ | ○ |

TABLE 10

|  | Example 2-24 | Example 2-25 | Example 2-26 | Example 2-27 |
|---|---|---|---|---|
| Vinyl Chloride Resin (average degree of polymerization 2000) | 100 | 80 | 20 | 20 |
| Vinyl Chloride Resin (average degree of polymerization 3000) | — | 20 | 80 | 80 |
| Plasticizer A | — | — | — | 40 |
| Plasticizer B | 40 | 40 | 40 | — |
| Stabilizer | 15 | 15 | 15 | 15 |
| Lanthanum oxide | 5 | 5 | 5 | 5 |
| Filler | 5 | 5 | 5 | 5 |
| Storage Modulus | ○ | ○ | ○ | ○ |
| High Temperature Abrasion Resistance | ○ | ○ | ○ | ○ |
| Peeling Property | ○ | ○ | ○ | ○ |
| Long-Term Heat Resistance | ○ | ○ | ○ | ○ |
| Abrasion Resistance | ○ | ○ | ○ | ○ |
| Material Processability | ○ | ○ | ○ | ○ |

TABLE 11

|  | Example 2-28 | Example 2-29 | Example 2-30 | Example 2-31 | Example 2-32 | Example 2-33 | Example 2-34 | Example 2-35 |
|---|---|---|---|---|---|---|---|---|
| Vinyl Chloride Resin (average degree of polymerization 2000) | — | — | — | — | — | — | — | — |
| Vinyl Chloride Resin (average degree of polymerization 3000) | 100 | 100 | 100 | 100 | 100 | 100 | 100 | 100 |
| Plasticizer A | 40 | 40 | 40 | 40 | 40 | 40 | 40 | 40 |
| Plasticizer B | — | — | — | — | — | — | — | — |
| Stabilizer | 1 | 1 | 2 | 2 | 3 | 3 | 4 | 4 |
| Lanthanum oxide | 10 | 15 | 10 | 15 | 5 | 15 | 5 | 15 |
| Filler | 5 | 5 | 5 | 5 | 5 | 5 | 5 | 5 |
| Storage Modulus | ○ | ○ | ○ | ○ | ○ | ○ | ○ | ○ |
| High Temperature Abrasion Resistance | ○ | ○ | ○ | ○ | ○ | ○ | ○ | ○ |
| Peeling Property | ○ | ○ | ○ | ○ | ○ | ○ | ○ | ○ |
| Long-Term Heat Resistance | ○ | ○ | ○ | ○ | ○ | ○ | ○ | ○ |
| Abrasion Resistance | ◎ | ◎ | ◎ | ◎ | ◎ | ◎ | ◎ | ◎ |
| Material Processability | ◎ | ◎ | ◎ | ◎ | ◎ | ◎ | ◎ | ◎ |

TABLE 12

|  | Comparative Example 2-1 | Comparative Example 2-2 | Comparative Example 2-3 | Comparative Example 2-4 |
|---|---|---|---|---|
| Vinyl Chloride Resin (average degree of polymerization 2000) | — | — | — | — |
| Vinyl Chloride Resin (average degree of polymerization 3000) | 100 | 100 | 100 | 100 |
| Plasticizer A | 60 | 40 | 40 | 40 |
| Plasticizer B | — | — | — | — |
| Stabilizer | 10 | 25 | 30 | 0.5 |
| Lanthanum oxide | 10 | — | — | — |
| Filler | 5 | 5 | 5 | 5 |
| Storage Modulus | X | X | X | X |
| High Temperature Abrasion Resistance | X | ○ | ○ | ○ |
| Peeling Property | ○ | ○ | ○ | ○ |
| Long-Term Heat Resistance | ○ | ○ | ○ | X |
| Abrasion Resistance | ○ | Δ | Δ | ◎ |
| Material Processability | ○ | X | X | ○ |

[Evaluation]

The resin compositions and the electric wire test samples according to the examples and the comparative examples were evaluated regarding the storage modulus, the high temperature abrasion resistance, the peeling property, the long-term heat resistance and the material processability similar to Example 1. Furthermore, an abrasion resistance was evaluated by the following method. Each evaluation result is illustrated in Table 7 to Table 12.

<Abrasion Resistance>

In accordance with scrape abrasion standards of ISO6722: 2006, an abrasion test was conducted on the obtained electric wire test sample according to each example. In the abrasion test, a needle whose diameter was 0.45±0.01 mm was used as an abrasive element. The abrasion test was conducted at four portions of one electric wire sample, and when a measurement portion was changed, the electric wire was rotated about the longitudinal direction by 90°. That is, the abrasion test was conducted for one electric wire test sample from 360°. Furthermore, when results obtained by measuring the four portions were regarded as one group, the smallest numerical value among the numbers of cycles of scrapes in this group was used as determination data of the electric wire test sample.

A case where the number of cycles of scrapes of the determination data was 10000 times or more, and the metal electrical conductor and the needle did not conduct was evaluated as "⊙". A case where the number of cycles of scrapes was 5000 times or more and less than 10000, and the metal electrical conductor and the needle conducted was evaluated as "○". In this regard, a case where the number of cycles of scrapes was less than 5000 times, and the metal electrical conductor and the needle conducted was evaluated as "Δ".

According to Examples 2-1 to 2-35, trimellitic acid alkyl ester was used as the plasticizer, and the stabilizer containing hydrotalcite is used as the stabilizer. Further, with respect to 100 parts by mass of the vinyl chloride resin, the content of the plasticizer is 25 parts by mass or more and less than 50 parts by mass, the content of the stabilizer is 1 to 15 parts by mass, and the content of lanthanum oxide is 1 to 15 parts by mass. It is found from Table 7 to Table 11 that the resin compositions according to Examples 2-1 to 2-35 have 0.1 MPa or more in storage modulus at 140° C., and also have an excellent high temperature abrasion resistance and peeling property.

By contrast with this, according to Comparative example 2-1 where the plasticizer is excessive, it is found that the storage modulus and the high temperature abrasion resistance deteriorate. Furthermore, according to Comparative examples 2-2 to 2-4 where lanthanum oxide is not contained, it is found that the storage modulus deteriorates.

The vehicle electric wire according to the present invention contains a compound containing a lanthanoid in an electrical insulation coating layer. Consequently, it is possible to secure a high heat resistance for a long period of time, and provide a good electrical insulation property even when the vehicle electric wire is used in high temperature environment.

The present invention has been described based on the embodiment. However, the present invention is not limited to this and can be variously modified within the scope of the subject matter of the present invention.

What is claimed is:

1. A vehicle electric wire comprising:
   an electrical insulation coating layer which contains: a vinyl chloride resin; a plasticizer which includes one type or two or more types selected from a trimellitic acid plasticizer and a pyromellitic acid plasticizer; a compound containing a lanthanoid which is at least one of lanthanum oxide and lanthanum hydroxide; a stabilizer; and a filler; and
   an electrical conductor which is coated with the electrical insulation coating layer,
   wherein, in the electrical insulation coating layer, with respect to 100 parts by mass of the vinyl chloride resin, a content of the plasticizer is 25 to 49 parts by mass, a content of the stabilizer is 1 to 15 parts by mass, and a content of the compound containing the lanthanoid is 1 to 15 parts by mass, and
   when dynamic viscoelasticity measurement using a dynamic viscoelasticity measurement device is performed on the electrical insulation coating layer at 0.5 Hz in frequency and under a temperature rise condition of 2° C./minute in temperature rise speed in a single cantilever measurement mode, a storage modulus at 140° C. is 0.1 MPa or more.

2. The vehicle electric wire according to claim 1, wherein when a scrape abrasion test defined by ISO 6722:2006 is conducted on the electric wire in which a thickness of the electrical insulation coating layer is 0.25 to 0.40±0.05 mm in test conditions that a needle whose diameter is 0.45±0.01 mm is used and a vertical force of 2±0.05 N is applied under an atmosphere at 120±1° C., the number of cycles of reciprocating movement is five or more.

3. The vehicle electric wire according to claim 1, wherein the plasticizer is a trimellitic acid alkyl ester, and the electrical insulation coating layer further contains the stabilizer containing a hydrotalcite.

4. The vehicle electric wire according to claim 3, wherein the trimellitic acid alkyl ester includes a linear alkyl group containing nine carbon atoms.

5. A wire harness comprising the vehicle electric wire according to claim 1.

* * * * *